(12) United States Patent
Johnson et al.

(10) Patent No.: US 6,384,892 B1
(45) Date of Patent: May 7, 2002

(54) LCD HAVING PARTICULAR DIELECTRIC CONSTANT RELATIONSHIP BETWEEN ORIENTATION FILM AND LC LAYER

(75) Inventors: Mark T. Johnson; Adrianus A. Van Der Put, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/482,930

(22) Filed: Jan. 13, 2000

(30) Foreign Application Priority Data

Jan. 13, 1999 (EP) .............................. 99200074

(51) Int. Cl.[7] .............................................. C09K 19/02
(52) U.S. Cl. ........................................ 349/177; 349/123
(58) Field of Search .......................... 349/123, 177, 349/171; 399/123, 171, 177

(56) References Cited

U.S. PATENT DOCUMENTS 5,165,076 A * 11/1992 Tsuboyama et al. ........ 349/184
5,532,854 A    7/1996 Fergason ..................... 359/93
5,600,464 A * 2/1997 Ohe et al. ................... 349/123
5,914,761 A * 6/1999 Ohe et al. ................... 349/132

FOREIGN PATENT DOCUMENTS

| EP | 0508227 A3 | 10/1992 | ......... G02F/1/1337 |
| EP | 0508227 A2 | 10/1992 | ......... G02F/1/1337 |
| EP | 0644452 A3 | 3/1995  | ......... G02F/1/1337 |
| EP | 0644452 A2 | 3/1995  | ......... G02F/1/1337 |

OTHER PUBLICATIONS

Chieu T C et al: "Effect of Alignment Layer Conductivity on the Bistability of Surface–Stabilized Ferroelectric Liquid –Crystal Devices" Applied Physics Letters, US, American Institute of Physics. New York, vol. 56, No. 14, Apr. 2, 1990, pp. 1326–1328.

* cited by examiner

Primary Examiner—Toan Ton
(74) Attorney, Agent, or Firm—Aaron Waxler

(57) ABSTRACT

In a liquid crystal display device, the dielectric constants ($\in$) and resistivities ($\rho$) of the liquid crystal material and the layers of orienting material have such values that the liquid crystal display device can be driven by means of a DC voltage.

11 Claims, 3 Drawing Sheets

LCD HAVING PARTICULAR DIELECTRIC CONSTANT RELATIONSHIP BETWEEN ORIENTATION FILM AND LC LAYER

BACKGROUND OF THE INVENTION

The invention relates to a liquid crystal display device comprising pixels and electrodes for driving the pixels, each pixel comprising a display element defined by picture electrodes, which display element comprises layers of orienting material and a layer of liquid crystal material between the picture electrodes.

Such liquid crystal display devices are generally known and used, for example, in monitors, but also in portable applications (organizers, mobile telephones).

OBJECTS AND SUMMARY OF THE INVENTION

A known phenomenon in such liquid crystal display devices is the displacement of ions in the liquid, so that degradation occurs, which becomes manifest as image retention. To prevent this, liquid crystal display devices are driven with an inverting or alternating voltage across the pixels. This is notably detrimental in portable applications because the use of an inverting voltage is accompanied by a high energy consumption and a high battery voltage for the drive electronics. This in turn leads to higher costs.

A liquid crystal display device according to the invention is characterized in that, for the quotient Q of a dielectric constant $\epsilon_{LC}$ of the liquid crystal material and the dielectric constant of the layers of orienting material $\epsilon_{ol}$, it holds that $Q = \epsilon_{LC}/\epsilon_{ol} > 0.7 \, \rho_{ol}/\rho_{LC}$, in which, for a liquid crystal material having a negative dielectric anisotropy ($\Delta\epsilon < 0$) $\epsilon_{LC}$, the dielectric constant perpendicular to the directors of the liquid crystal material is ($\epsilon_\perp$), and for a liquid crystal material having a positive dielectric anisotropy ($\Delta\epsilon > 0$) $\epsilon_{LC}$, the dielectric constant parallel to the directors of the liquid crystal material is ($531_\parallel$) and $\rho_{ol}$ and $\rho_{LC}$ are the resistivities of the liquid crystal material and the layers of orienting material, respectively.

The orientation layer may comprise sub-layers of different material. In that case, $\rho_{ol}$ is understood to mean the average resistivity of the orientation layer.

The value Q is preferably between 0.4 and 4, while values of between 1.2 and 3 look optimal.

To inhibit image retention even further, a first embodiment is characterized in that $\rho_{ol}/\rho_{LC} < 10$ (and preferably<5) at 25° C. To prevent lateral conduction in the orientation layers, $\rho_{ol}$ is chosen to be $>10^7$ ohmmeter (T=25° C.).

A further embodiment is characterized in that the liquid crystal display device comprises means for presenting drive voltages in one polarity across the pixels (DC drive). In this connection, one polarity is understood to mean that no measures have been taken to change the polarity across the pixels during operations over a longer period of time (e.g. 1000 or 2000 frame times), but measures may be taken to drive the pixels with opposite polarity when modes are re-used or changed (for example, switching from or to a standby mode in a display in a portable application or switching between use of modes, Internetpages etc. in computer applications) of the display device.

The inventors have surprisingly found that the display device can be DC-driven without degradation or image retention occurring in said combination of dielectric constants of the orienting material and of the liquid crystal material. By approximation, a theoretical explanation can also be given for this effect. Since the display device is now DC driven, the electronics for continuously reversing the voltage across a pixel may be dispensed with. (Reversing can be restricted to e.g. once every minute or five minutes). Moreover, there is no flicker.

These and other aspects of the invention are apparent from and will be elucidated with reference to the embodiments described hereinafter.

BRIEF DESCRIPTION OF THE DRAWINGS

In the drawings:

FIG. 3 shows the maximum change with respect to time $\Delta V_{lc,max}$ across the liquid crystal layer as function of the applied drive voltage, while

DESCRIPTION OF THE PREFERRED EMBODIMENTS

Figure 1:
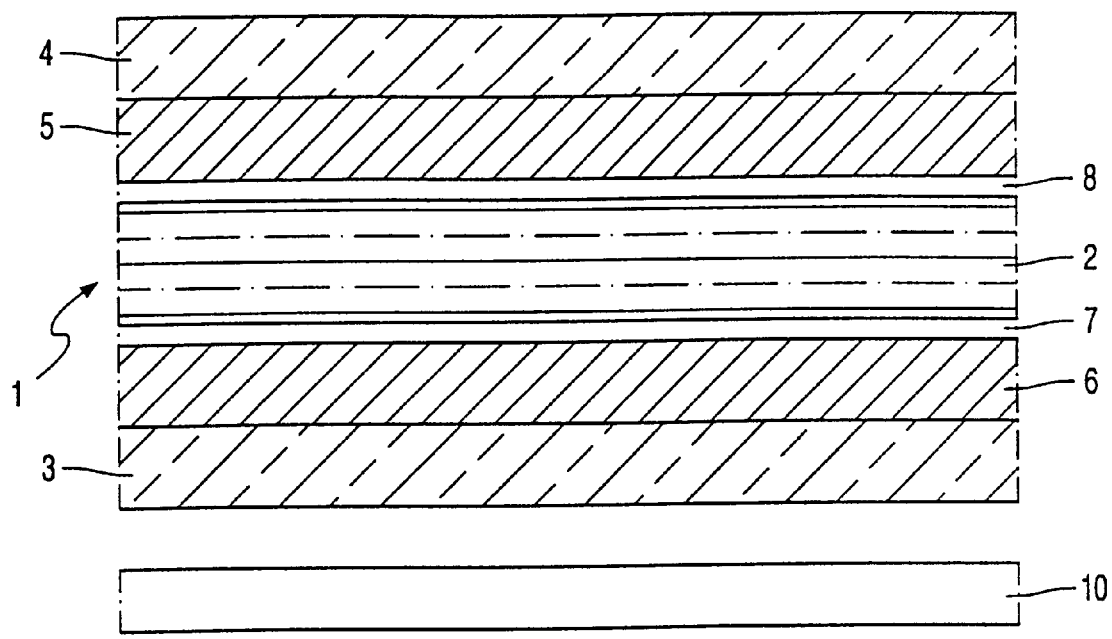
FIG. 1 shows diagrammatically a part of a liquid crystal display device.

FIG. 1 is a diagrammatic cross-section of a part of a liquid crystal display device comprising a liquid crystal cell 1 with a twisted nematic liquid crystal material 2 which is present between two substrates 3, 4 of, for example, glass, provided with electrodes 5, 6. The device further comprises two orientation layers 7, 8 which orient the liquid crystal material on the inner walls of the substrates, in this example in the direction of the axes of polarization of polarizers (not shown), such that the cell has a twist angle of 90°. In this example, the liquid crystal material has a positive optical anisotropy and a positive dielectric anisotropy. If the electrodes 5, 6 are energized with an electric voltage, the molecules, and hence the directors, are directed towards the field. The display device further comprises a backlight 10 (in this example). Alternatively, the display device may be reflective.

Figure 2:
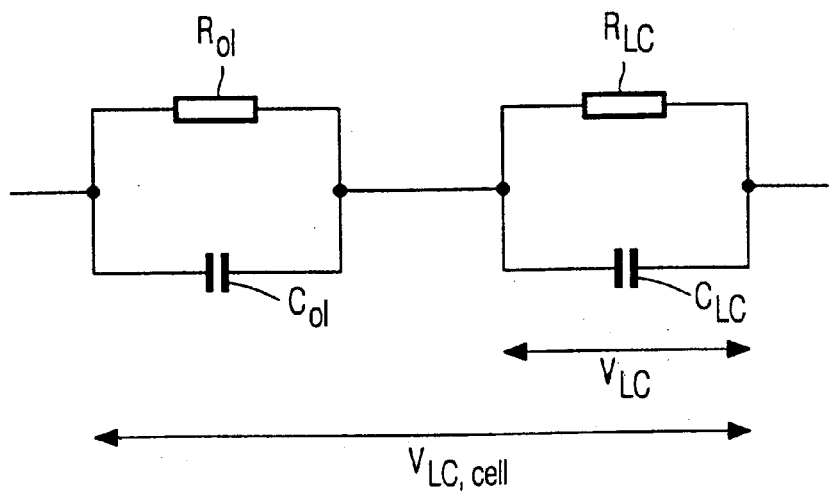
FIG. 2 shows an equivalent circuit diagram of the display cell in FIG. 1.

In a first approximation, both the combined orientation layers 7, 8 and the layer of liquid crystal material 2 (LC layer) can be described as a parallel circuit of a resistor and a capacitor, as is shown in FIG. 2. Upon DC drive, the behavior of the voltage across the LC layer ($V_{lc}(t)$), analogous to a step response, will be:

$$V_{lc}(t) = [R^* + ((1/C^*) - R^*).\exp.(-t/\tau)].V_{lc,cell} \quad (1)$$

in which $$R^* = R_{LC}/(R_{ol} + R_{LC}) \text{ and } C^* = (C_{ol} + C_{LC})/C_{ol}$$

(R and C represent the resistance per surface unit and the capacitance per surface unit, respectively, R=$\rho$.d ($\rho$: resistivity, d: layer thickness) and C=($\epsilon_0 \cdot \epsilon_r$)/d, while $\tau = R^* C^* . R_{ol} C_{ol}$. ($V_{lc,cell}$: voltage applied across the cell).

The maximum change in $V_{lc}(t)$ then is $$\Delta V_{lc} = V_{lc}(t=0) - V_{lc}(t=\infty) = [R^* - (1/C^*)].V_{lc,cell} \quad (2)$$

or $$\Delta V_{lc,max} = [1/(1+RD) - 1/(1+(D/E(V))] \quad (3),$$

in which $$D=d_{ol}/d_{LC}\ R=\rho_{ol}/\rho_{LC}\ \text{and}\ E(V)=\epsilon_{ol}/\epsilon_{cell}(V) \qquad (4)$$

The voltage dependence of $\epsilon_{cell}(V)$ is the result of the change of the average dielectric constant in the liquid crystal layer and is approximately described by:

$$\epsilon_{cell}(V)=(\epsilon_\|)-\Delta\epsilon.(V_{th}/V) \qquad (5)$$

($\epsilon_\|$) is the dielectric constant parallel to the directors (the axes of the liquid crystal molecules) of the liquid crystal material ($V=V_{LC,Cell}\approx V_{LC}$)

$\Delta\epsilon=\epsilon_\|-\epsilon_\perp$, $V_{th}$: threshold voltage of the display cell. Equation (5) applies to $V>V_{th}$.

Since the thickness of the orientation layer is much smaller in practice than that of the layer of liquid crystalline material (D<<1), the term 1/(1+D) in equation (3) can be approximated by (1−D). Equation (3) may then be written as $$\Delta V_{lc,max}=[1-RD-(1-(D/E(V))].V=[(1/E(V)-R].DV \qquad (6)$$

When equation (5) is used for E(V), this yields with (4):

$$\Delta V_{lc,max}=[(\epsilon_\|/\epsilon_{ol})-R].DV-(\Delta\epsilon/\epsilon_{ol}).DV_{th}. \qquad (7)$$

Figure 3:
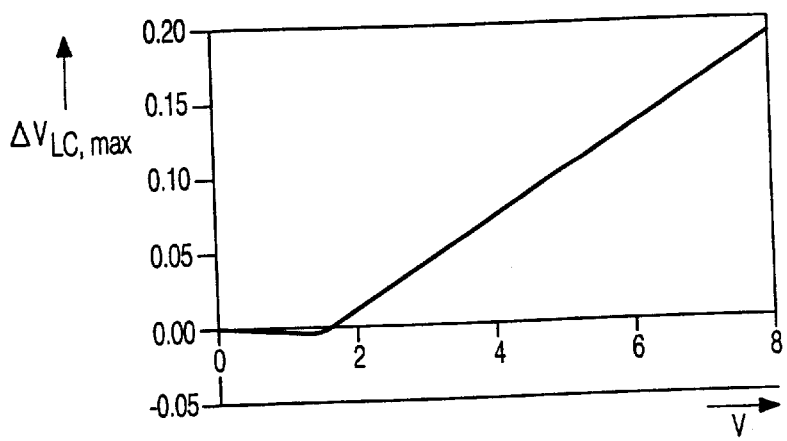

FIG. 3 shows the variation of $\Delta V_{lc,max}$ (formula (6)) for a display cell with $d_{ol}$=100 nm, $d_{LC}$=4 μm, $\rho_{ol}=\rho_{LC}=10^{13}$ ohmmeter, $\epsilon_{ol}$=3.5, while $\epsilon_{LC}(V)$ is defined by formula (5), in which $\epsilon_\|$=8 and $\epsilon_\perp$=3, or $\epsilon_{LC}/\epsilon_{ol}=\epsilon_\|/\epsilon_\perp$=2.3, while $\rho_{ol}/\rho_{LC}$=1. It appears from FIG. 3 that the maximum voltage change $\Delta V_{lc,max}$ for $V>V_{th}$ varies practically linearly; the slope of the curve has a value which is defined by $$d(\Delta V_{lc,max})/dV=[(\epsilon_\|/\epsilon_{ol})-R.D] \qquad (8)$$

Figure 4:
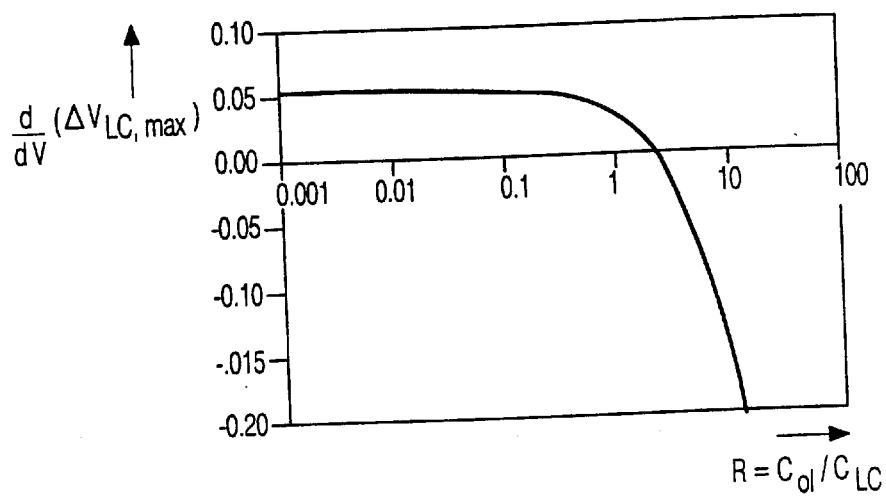
FIG. 4 shows the influence of $R = \rho_{ol}/\rho_{LC}$ on the slope $d(\Delta V_{lc,max})/dV$.

This derived function is practically constant for $V>V_{th}$, while it has a value of 0 for $\epsilon_{LC}/\epsilon_{ol}=\rho_{ol}/\rho_{LC}$. FIG. 4 shows the influence of $R=\rho_{ol}/\rho_{LC}$ on $d(\Delta V_{lc,max})/dV$. The Figure shows that for R<2.7, the slope of the curve reaches said constant value fairly rapidly (at R~0,1). Since the maximum change of the drive voltage remains limited to approximately 4 V (in a voltage range between $V_{th}$ and the saturation voltage $V_{sat}$) for (super)twisted nematic LCDs, and the maximum value of the slope is of the order of 0.06, voltage corrections remain limited to values of approximately 0.25 V (see also FIG. 3). A maximum change of the slope of 0.10 is admissible; at a small number of grey values and an average correction voltage for all grey values, even a larger slope may be admitted.

It is also apparent from FIG. 4 that, for R>2.7, the value of the slope rapidly increases (in absolute value). Up to R≈5 (which corresponds to $\epsilon_{LC}/\epsilon_{ol}$=0.7 $\rho_{ol}/\rho_{LC}$), the maximum value of the slope remains below approximately 0.06, so that the same considerations apply as above.

To prevent image retention, $\rho_{LC}$ should not be too high with respect to $\rho_{ol}$. Therefore, preferably, $\rho_{ol}/\rho_{LC}$<10 (and <5 in practice). To prevent lateral conduction occurring on a substrate between the electrodes in a display device having a plurality of electrodes, $\rho_{ol}$ is at least $10^7$ ohmmeter (and preferably at least $10^8$ ohmmeter).

Figure 5:
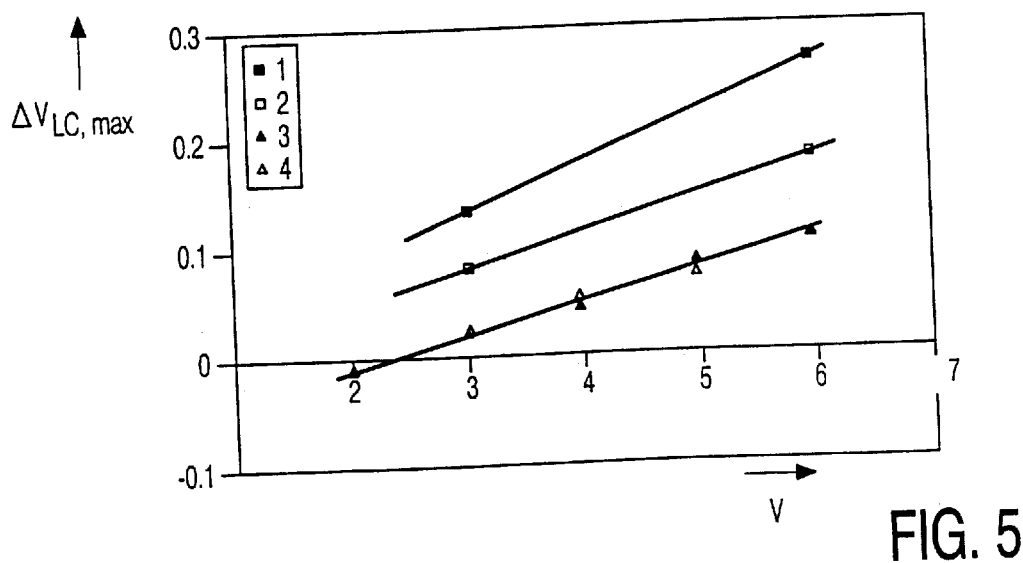
FIG. 5 shows the maximum change with respect to time $\Delta V_{lc,max}$ as a function of the applied drive voltage for different liquids.

FIG. 5 shows measured values for the voltage $\Delta V_{lc,max}$ as a function of the (DC) drive voltage for different types of display cells (different combinations of materials for the orientation layers and the liquid crystal material). In all cases, $\epsilon_{LC}/\epsilon_{ol}=\epsilon_\|/\epsilon_{ol}$ approximately 8/3≈2.7 and R=$\rho_{ol}/\rho_{LC}$≈1.5, so that it holds that $\epsilon_{LC}/\epsilon_{ol}$≈1.8 $\rho_{ol}/\rho_{LC}$. Also for this comparatively high value of R, it appears that constant values of the slopes $d(\Delta V_{lc,max})/dV$ are found. Moreover, it appeared that these slopes did not change at a change of the temperature (measurements at 30 and 60° C.).

EXAMPLES (In all examples, the LC layer has a thickness of 4 μm and the orientation layers have an overall thickness of 0.1 μm).

1. For a cell with a liquid crystal material with $\epsilon_\|$=8 and $\epsilon_{ol}$=3.6, it holds that $\epsilon_{LC}/\epsilon_{ol}=\epsilon_\|/\epsilon_{ol}$≈2.22. Furthermore it holds that $\rho_{ol}=\rho_{LC}=3.10^{12}$ ohmmeter, so that it holds that $\rho_{ol}/\rho_{LC}$=1 and $\epsilon_{LC}/\epsilon_{ol}$≈2.22 $\rho_{ol}/\rho_{LC}$. For the slope $d(\Delta V_{lc,max})/dV$, a value of 0.025 was found.

2. For a cell with a liquid crystal material, with $\epsilon_{81}$=8 and $\epsilon_{ol}$=3.6, it holds that $\epsilon_{LC}/\epsilon_{ol}=\epsilon_\|/\epsilon_{ol}$≈2.22. Furthermore it holds that $\rho_{ol}=4.10^{13}$ ohmmeter en $\rho_{LC}=5.10^{13}$ ohmmeter, so that it holds that $\rho_{ol}/\rho_{LC}$=0.8 and $\rho_{LC}/\rho_{ol}$≈2.77 $\rho_{ol}/\rho_{LC}$. For the slope $d(\Delta V_{lc,max})/dV$, a value of 0.03 was found.

3. For a cell with a liquid crystal material with $\epsilon_\|$=8.7 and $\epsilon_{ol}$=3.6, it holds that $\epsilon_{LC}/\epsilon_{ol}=\epsilon_\|/\epsilon_{ol}$≈2.42. Furthermore it holds that $\rho_{ol}=4.10^{12}$ ohmmeter and $\rho_{LC}=6.10^{12}$ ohmmeter, so that it holds that $\rho_{ol}/\rho_{LC}$=0.66 and $\epsilon_{LC}/\epsilon_{ol}$26 3.66 $\rho_{ol}/\rho_{LC}$. For the slope $d(\Delta V_{lc,max})/dV$, a value of 0.04 was found.

It appears from the first three examples that $d(\Delta V_{lc,max})/dV$ decreases with a decreasing value of Q. By means of a computer simulation, which also corresponded to the other examples, it was shown that a slope of approximately zero is reached at Q≈1.5. For 1<Q<1.8, the slope is substantially negligible, certainly when $\rho_{ol}\leq\rho_{LC}$.

For a cell with a liquid crystal material with $\epsilon_\|$=8 and $\epsilon_{ol}$=3, it holds that $\epsilon_{LC}/\epsilon_{ol}=\epsilon_\|/\epsilon_{ol}$26 2.66. Furthermore it holds that $\rho_{ol}=1.8.10^{12}$ ohmmeter en $\rho_{LC}=1.5.10^{12}$ ohmmeter, so that it holds that $\rho_{ol}/\rho_{LC}$=1.2 and $\epsilon_{LC}/\epsilon_{ol}$≈2.22 $\rho_{ol}/\rho_{LC}$. For the slope $d(\Delta V_{lc,max})/dV$, a value of 0.04 was found.

Counterexample 1: For a cell with a liquid crystal material with $\epsilon_\|$=8.3 and $\epsilon_{ol}$=3, it holds that $\epsilon_{LC}/\epsilon_{ol}=\epsilon_\|/\epsilon_{ol}$≈2.77. Furthermore it holds that $\rho_{ol}=1.8.10^{15}$ ohmmeter and $\rho_{LC}=10^{14}$ ohmmeter, so that it holds that $\rho_{ol}/\rho_{LC}$=10 and $\epsilon_{LC}/\epsilon_{ol}$≈0.27. $\rho_{ol}/\rho_{LC}$. For the slope $d(\Delta V_{lc,max})/dV$, a value of 0.20 was found.

Counterexample 2: For a cell with a liquid crystal material with $\epsilon_\|$=8 and $\epsilon_{ol}$=3.5, it holds that $\epsilon_{LC}/\epsilon_{ol}=\epsilon_\|/\epsilon_{ol}$≈2.29. Furthermore it holds that $\rho_{ol}=10^{13}$ ohmmeter and $\rho_{LC}=3.10^{12}$ ohmmeter, so that it holds that $\rho_{ol}/\rho_{LC}$=3.33 and $\epsilon_{LC}/\epsilon_{ol}$≈0.69. $\rho_{ol}/\rho_{LC}$. For the slope $d(\Delta V_{lc,max})/dV$, a value of 0.10 was found.

Figure 6:
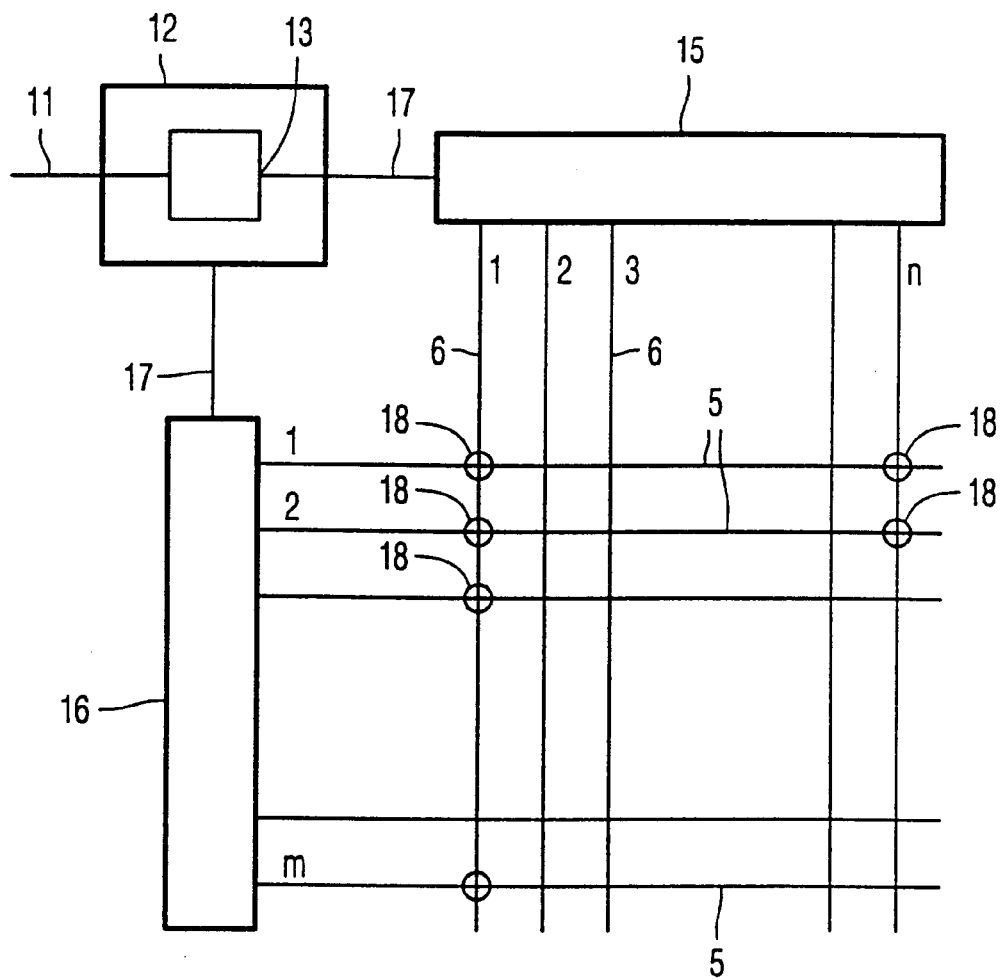
FIG. 6 shows diagrammatically a display device.

FIG. 6 is an equivalent circuit diagram of a part of a display device 1 in which the invention has been applied. This device comprises a matrix of pixels 18 at the area of crossings of m row or selection electrodes 5 and n column or data electrodes 6. The row electrodes are successively selected by means of a row driver 16, while the column electrodes are provided with data via a data register 15. If necessary, incoming data signals 11 are first processed for this purpose in a processor 12. Mutual synchronization between the row driver 16 and the data register 15 takes place via drive lines 17.

Drive signals from the row driver 16 select the row electrodes 5. The signal present at the column electrode 6 defines the information to be displayed. Although a display device of the passive type is shown, the invention also applies to an active matrix. In that case, separate pixels are connected to the row electrodes via switches (for example, thin-film transistors or two-pole circuits). Selection may also take place by means of plasma channels (Plasma Addressed Liquid Crystal Display).

As shown above, the values of $\Delta V_{lc,max}$ remain within admissible limits at the chosen value for the slope $d(\Delta V_{lc,}$ $_{max}$)/dV. The value of $\Delta V_{lc,max}$ is dependent on the presented voltage (the grey value). In a simple solution, either all voltages on the column electrodes or all voltages on the row electrodes may be given the same correction voltage (offset). This correction voltage will usually be determined by the average value of the voltage range to be used.

In a device in which many grey scales are displayed, the data voltage on the column electrode is adapted preferably for each value of the incoming signal 11, for example, by means of a look-up table 13 in the processor 12.

Although the above-mentioned examples are based on liquid crystal materials having a positive dielectric anisotropy, a similar consideration applies to liquid crystal materials having a negative dielectric anisotropy.

The value $\Delta V_{lc,max}$ is also dependent on the voltage across the cell. In color images, a mixed color is formed by the images of, for example, a red, a green and a blue pixel. If, for example, the red pixel receives a low voltage (maximum transmission in the case of crossed polarizers), while the two other pixels receive, for example, an average voltage, on which average voltage also an average correction voltage for all pixels is based, this leads to discoloration due to a too high correction for the red pixel. Image retention may also occur when the device is driven with the same information for a longer period of time. This is largely prevented by driving the display device color-sequentially. In that case, the backlight 10 supplies one of the three colors in the case of a full color display by means of three sub-images (red, green, blue) for ⅓ of a frame time, while the liquid crystal display device comprises information of the relevant sub-image. Since the voltage across the pixel is generally different for the three sub-images, the above-mentioned image retention occurs less rapidly. This is of course also possible with images composed of two sub-images of a different color.

In summary, the invention relates to a liquid crystal display device whose dielectric constants $\in_{LC}$ of the liquid crystal material and of the layers of orienting material, as well as the resistivity of the liquid crystal material and the layers of orienting material are chosen to be such that the display device can be driven by means of a DC voltage.

The invention resides in each and every novel characteristic feature and each and every combination of characteristic features.

What is claimed is:

1. A liquid crystal display device comprising pixels and electrodes for driving the pixels, each pixel comprising a display element defined by picture electrodes, which display element comprises layers of orienting material and a layer of liquid crystal material between the picture electrodes, characterized in that, for the quotient Q of a dielectric constant $\in_{LC}$ of the liquid crystal material and the dielectric constant of the layers of orienting material $\in_{ol}$ it holds that $Q=\in_{LC}/\in_{ol}>0.7\rho_{ol}/\rho_{LC}$, in which, for a liquid crystal material having a negative dielectric anisotropy ($\Delta\in<0$)$\in_{LC}$, the dielectric constant perpendicular to the directors of the liquid crystal material is ($\in_\perp$), and for a liquid crystal material having a positive dielectric anisotropy ($\Delta\in>0$)$\in_{LC}$, the dielectric constant parallel to the directors of the liquid crystal material is ($\in_\parallel$) and $\rho_{ol}$ and $\rho_{LC}$ are the resistivities of the liquid crystal material and the layers of orienting material, respectively, and wherein the display device is DC driven.

2. A liquid crystal display device as claimed in claim 1, characterized in that $Q=\in_{LC}/\in_{ol}\geq\rho_{ol}/\rho_{LC}$.

3. A liquid crystal display device as claimed in claim 1, characterized in that $Q=\in_{LC}/\in_{ol}$ has a value of between 1 and 4.

4. A liquid crystal display device as claimed in claim 3, characterized in that $1\leq Q\leq 1.8$.

5. A liquid crystal display device as claimed in claim 1, characterized in that $\rho_{ol}/\rho_{LC}<10$ (T=25° C.).

6. A liquid crystal display device as claimed in claim 1, characterized in that $\rho_{ol}$ is at least $10^7$ ohmmeter (T=25° C.).

7. A liquid crystal display device as claimed in claim 1, characterized in that the display device comprises means for presenting drive voltages in one polarity across the pixels.

8. A liquid crystal display device as claimed in claim 7, characterized in that the display device comprises drive means for presenting row selection signals to the row electrodes and drive means for presenting data signals to the column electrodes.

9. A liquid crystal display device as claimed in claim 8, characterized in that the drive means for presenting data signals comprise correction means for adapting the voltage of the data signals in dependence upon presented data.

10. A liquid crystal display device as claimed in claim 7, characterized in that the display device is provided with an illumination unit comprising means for sequentially presenting light in at least two wavelength ranges, and the drive means are provided with means for presenting, to the display device, the data signals of a wavelength range-associated sub-image of an image to be displayed.

11. A liquid crystal display device as claimed in claim 1, characterized in that the display device comprises driving means for inverting the voltages over the display elements at switching on the display device or after a period of one minute.

\* \* \* \* \*